J. P. SCHMIT.
TRACTOR.
APPLICATION FILED APR. 19, 1915.

1,173,313.

Patented Feb. 29, 1916.
2 SHEETS—SHEET 1.

Witnesses
W. H. Mulligan
C. V. P. Newbold

Inventor
John P. Schmit
By Richard B. Owen
Attorney

J. P. SCHMIT.
TRACTOR.
APPLICATION FILED APR. 19, 1915.
1,173,313.
Patented Feb. 29, 1916.
2 SHEETS—SHEET 2.
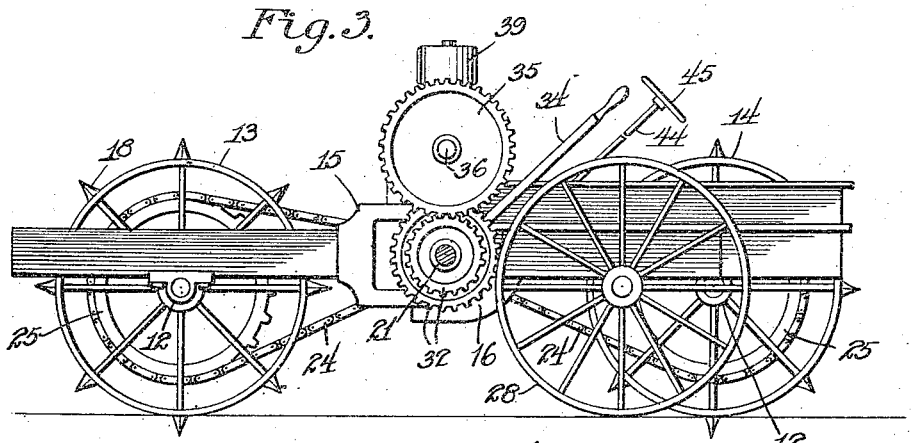
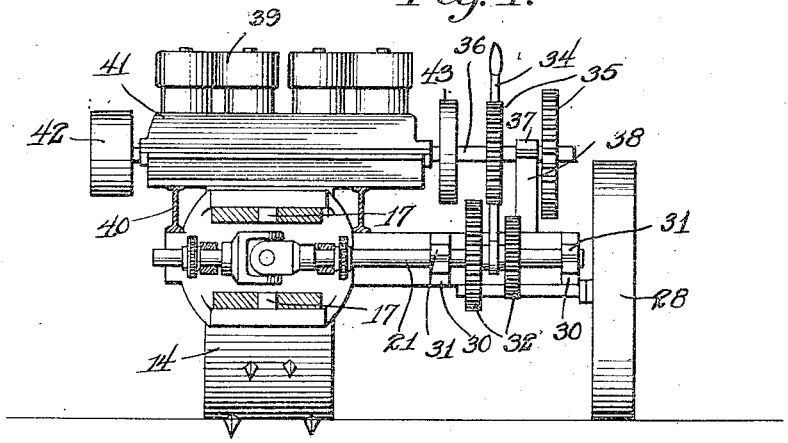
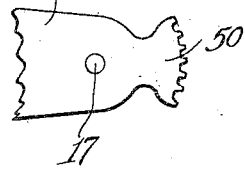
Witnesses
Inventor
John P. Schmit
By Richard Bowen,
Attorney

UNITED STATES PATENT OFFICE.

JOHN P. SCHMIT, OF LEWISTOWN, MONTANA.

TRACTOR.

1,173,313.　　　　Specification of Letters Patent.　　Patented Feb. 29, 1916.

Application filed April 19, 1915. Serial No. 22,401.

*To all whom it may concern:*

Be it known that I, JOHN P. SCHMIT, a citizen of the United States, residing at Lewistown, in the county of Fergus and State of Montana, have invented certain new and useful Improvements in Tractors, of which the following is a specification.

This invention relates to tractors and is more particularly concerned in the provision of a tractor, the engine of which may be transversely positioned with respect to the longitudinal axis of the machine in order to permit a direct drive to the wheels of the tractor, and to dispense with the usual differential.

An object of equal importance with the foregoing is to provide a tractor in which the wheels shall be mounted in separate frames, such frames being connected by means of an articulated joint to permit guiding of the machine by an angular variation between the separate wheel frames.

It is a further object of this invention to provide a tractor of the foregoing type in which an articulated chassis is provided for the intermediate seating of an engine, a universal joint connecting portions of such chassis and the drive shaft of the engine being similarly provided with a universal joint interiorly of the point of chassis articulation.

The above and additional objects which will become apparent as this explanatory description proceeds, are accomplished by such means as are illustrated in the accompanying drawings, described in the following specification and then more particularly pointed out in the claims which are appended hereto and form a part of this application.

Figure 1:
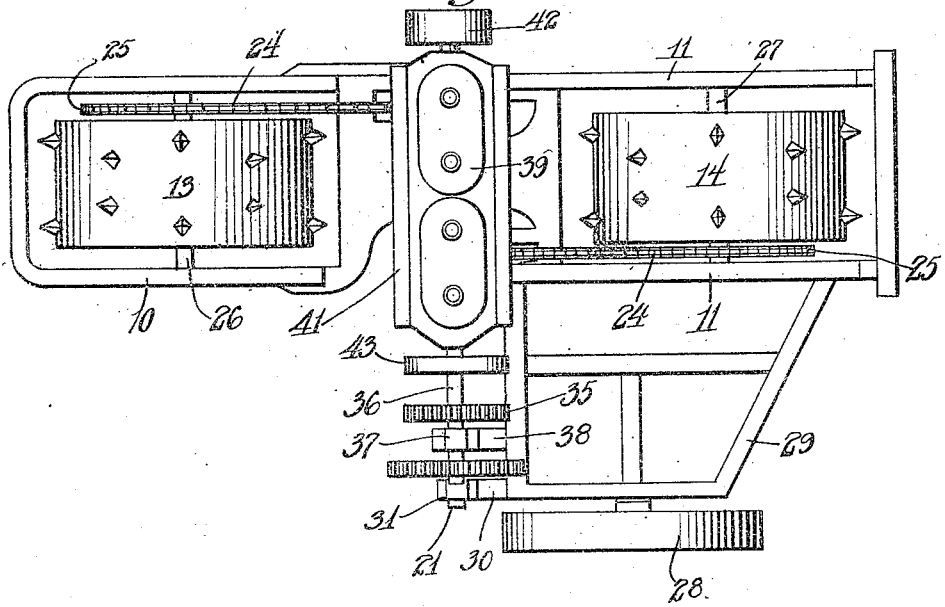
Figure 2:
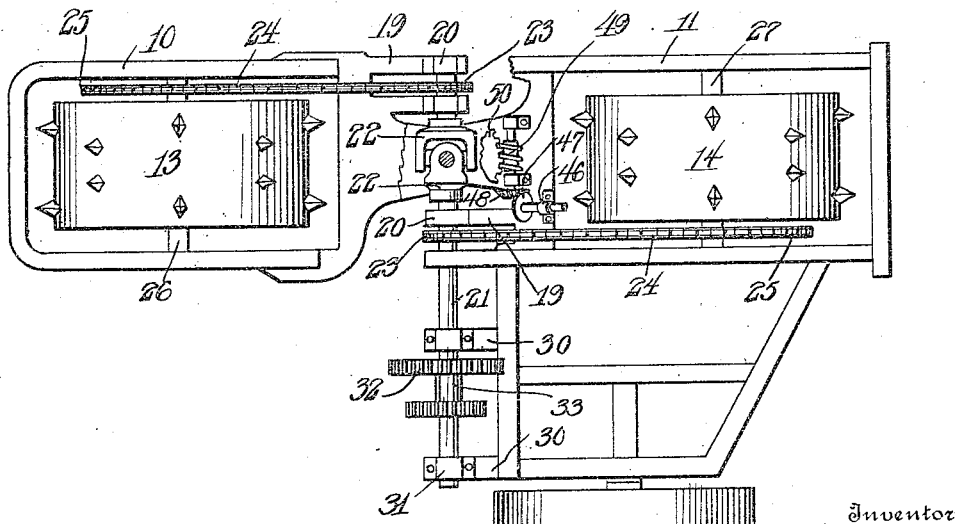

With reference to the drawings, wherein there is illustrated the preferred embodiment of this invention, as it is reduced to practice, and throughout the several views of which like characters of reference designate similar parts: Figure 1 is a plan view of the tractor of this invention, Fig. 2 is a view similar to Fig. 1 but the engine and its adjuncts being removed to show the universally jointed drive shaft and the steering connections for the vehicle, Fig. 3 is an elevational view of the matter disclosed in Fig. 1, Fig. 4 is a transverse vertical sectional view through the tractor showing the drive and steering gear in detail, and Fig. 5 is a detail plan of the steering sector as attached to the forward frame.

In the tractor, there is made use of a pair of chassis frames in which are independently supported the drive wheels of the vehicle, such frames being joined by a universal connection permitting angular variation of the leading frame from its normal alinement with the following frame when the vehicle is taking a curve. These frames are denoted by the numerals 10 and 11 respectively mounting in brackets 12 of a suitable description, the forward and rear drive wheels 13 and 14, each of which is adapted to be driven. The articulation between the frames is afforded by means of a pair of yoke members 15 and 16 which are cast directly upon adjacent extremities of the frames 10 and 11. These members are substantially U-shaped and engage with each other in the well-known manner of a universal joint, contacting flanges of the members being pivoted by studs 17 in vertical alinement, thus permitting a swiveling movement through horizontal angles between the frames 10 and 11 but maintaining a longitudinal rigidity between the frames against vertical pressures. Each of the tractor wheels 13 and 14 are preferably provided with the usually peripherally arranged spikes 18 to insure traction between the wheels and any surface over which the machine may pass.

Formed laterally upon each yoke casting 15 and 16 and upon opposite sides of the pivoting point between such yokes are a pair of bearing arms 19 terminating in bearings 20 in which there are journaled portions of the drive shaft denoted as a whole by the numeral 21. This drive shaft has the mentioned portions thereof separated and the meeting ends of each provided with a yoke member 22 which in the manner already described as providing articulation between the frames forms a universal joint calculated to permit angular variation between the alinement of frames 10 and 11 without interfering with the driving connections between each frame and the shaft 21. These connections include a sprocket 23 carried by each shaft portion between the spaced bearing arms 19 such sprockets being connected by the chains 24 or a similar means to large gears or sprockets 25 carried by the axles 26 and 27 which respectively mount the forward wheel 13 and the rear wheel 14.

To prevent destruction of the machine's stability which might otherwise occur were it provided with forward and rear wheels only, an idler wheel 28 is mounted upon a stub shaft carried by a suitable outrigger frame 29 which extends outwardly from the rear frame 11 and is securely braced thereto. Hangers 30 project forwardly from this frame and support at their outer extremities bearings 31 for the drive shaft 21, the latter being provided between such bearing arms with the transmission gears 32 mutually mounted upon a slidable sleeve 33 which may be controlled by the operator of the tractor through the medium of any desirable lever 34 having the customary means of sliding the sleeve with its transmission gears along the shaft 21. These transmission gears 32 are adapted to mesh with the two-speed gears 35, each of which is rigidly mounted upon the engine shaft 36, the latter being supported at its outer extremity within a bearing 37 maintained upon the bracing standard 38 projecting upwardly from the outrigger frame 29. It will be noted from this that the engine shaft is thus positioned transversely of the machine instead of being longitudinally alined therewith. The motor indicated in general by the numeral 39 is supported upon I-beams 40 carried upon the side members of the frame 11 and is transversely positioned directly over the articulated joint between the drive wheel frames so that the engine shaft 36 is superimposed above the drive shaft 21, the latter being driven according to a shifting of the gears 32 thereupon. The opposite extremity of the engine shaft 36 projects through the crank casing 41 to carry a pulley 42, through the medium of which the tractor of this invention may be belted to drive any stationary machinery desired, the shaft 21 not being driven at that time. A fly wheel 43 is also mounted upon the engine shaft and upon the opposite side from the pulley 42, and may also serve as a belt pulley should occasion arise. Steering means for the tractor may include a post 44 manually operable through the hand wheel 45, such post extending through a supporting bracket 46 as shown in Fig. 2 and carrying at its lowermost extremity the pinion 47 meshing with the similar pinion 48 mounted at the extremity of the worm shaft 49, such worm meshing with a segment 50 which is preferably supported by some adjacent portion of the yoke member 15. Rotation of the hand wheel 45 being transmitted through the beveled pinions and worm to the segment 50 will, of course, cause a pivotal movement of the forward frame 10 with respect to the frame 11 and upon the pivotal line determined by the stud 17.

From the foregoing, it will be seen that a tractor has been provided whose advantages are in particular, simplicity and solidity of construction which has been accomplished only by the arrangement of parts disclosed. By transmitting driving power to each of the wheels 13 and 14, a more even and balanced travel of the tractor is secured, particularly when under heavy loads. By positioning the engine 39 transversely of the machine the differential gears are entirely dispensed with and the necessity of weakening the wheel mounted by divided axles is dispensed with, while the number of gears employed is reduced to the minimum. A simple steering of the machine is provided which is based upon an articulation of the tractor frames which also includes universal jointing of the drive shaft. The outrigger frame prevents any tipping on the part of the machine, while means are also provided as disclosed for varying the speed of the tractor under way and for driving stationary mechanism in making use of the engine of the tractor as a stationary prime mover.

While in the foregoing, however, there has thus been illustrated in the drawings and described in the specification such combination and arrangement of elements as constitute the preferred embodiment of this invention, it is desired to emphasize the fact that such minor changes in the matters of proportion and degree may be made in later adaptations of this device, as shall not alter the spirit of the invention as defined in the appended claims.

What is claimed is:

1. A tractor including a pair of articulated frames, a drive wheel journaled in each frame, an outrigger frame connected to one of said first-frames, and a prime mover for said tractor supported over the point of articulation transversely of the tractor.

2. A tractor including articulated frames, a drive wheel journaled in each frame, an outrigger frame connected to one of first said frames, and a prime mover for said tractor supported over the point of articulation transversely of the tractor.

3. In a tractor, forward and rear chassis frames, a drive wheel journaled in each frame, an outrigger frame connected to said rear frame, a following wheel mounted in said outrigger frame, universal joint connections between first said frames, and a prime mover over said universal joint connections.

4. A tractor including forward and rear chassis frames, a drive wheel journaled in each frame, an outrigger frame connected to said rear chassis frame, a following wheel mounted by said outrigger frame, U-shaped castings upon the meeting ends of said chassis frames, pivotal connections between said castings, and a prime mover mounted upon said castings.

5. A tractor including forward and rear chassis frames, a drive wheel journaled in each frame, an outrigger frame connected to said rear chassis frame, a following wheel mounted by said outrigger frame, U-shaped castings upon the meeting ends of said chassis frames, pivotal connections between said castings, a prime mover mounted above said pivotal connections, and a drive shaft operated directly by said prime mover and transversely positioned upon said tractor.

6. In a tractor, an articulated chassis including forward and rear frames, U-shaped castings pivotally connecting said frames, a drive wheel journaled in each of said frames, an outrigger frame, a following wheel supported by said outrigger frame, a drive shaft positioned transversely of the tractor, a prime mover for said tractor above said V-shaped castings and having a shaft paralleling said drive shaft, and connections between said drive shaft and each of said drive wheels.

7. In a tractor, an articulated chassis including forward and rear frames, yokes pivotally connecting said frames, a drive wheel journaled in each frame, an outrigger frame connected to one of first said frames, a following wheel mounted by said outrigger frame, a drive shaft extending between said yoke members and having its outer ends supported in said outrigger frame transversely of the tractor, an engine shaft paralleling said drive shaft and having its outer ends similarly supported by said outrigger frame, and a prime mover also transversely positioned upon said chassis and supported by one of said frames.

8. In a tractor, an articulated chassis including frames, yokes pivotally connecting said frames, a drive wheel journaled in each frame, an outrigger frame connected to one of first said frames, a balance wheel carried by said outrigger frame, standards extending from last said frame, bearings formed on said yokes, a drive shaft formed of separable portions journaled in said bearings and said standards to extend transversely of the tractor chassis, universal joint connections between said drive shaft portions, an engine shaft paralleling said drive shaft, and a prime mover directly driving said engine shaft and similarly situated transversely of the tractor.

9. In a tractor, an articulated chassis including frames, yokes pivotally connecting said frames, a drive wheel journaled in each frame, an outrigger frame secured to one of said frames, a balance wheel carried by said outrigger frame, bearings formed in pairs integrally with said yokes and laterally thereof, standards extending from said outrigger frame, a drive shaft including separable portions journaled in said bearings and said standards, universal joint connections between the first said frames, a sleeve splined upon said drive shaft, gears carried by said sleeve, means for actuating said sleeve along said drive shaft, fixed gears carried by said engine shaft to respectively mesh with said sliding gears, a pulley upon the other end of said engine shaft, and a prime mover located transversely of the tractor for direct drive of said engine shaft.

10. In a tractor, an articulated chassis, including end frames, yokes pivotally connecting said frames, a drive wheel journaled in each frame, an outrigger frame carried by the rear end frame, a balance wheel carried by said outrigger frame, bearings formed in pairs on each yoke portion, a drive shaft portion journaled in each pair of bearings. a universal joint connection between said shaft portions, a sprocket carried by each shaft portion between said bearings, driving connections between each sprocket and respective drive wheels, an engine shaft transversely positioned of the tractor to parallel said drive shaft, sliding gear connections between said shafts, a prime mover positioned transversely of said tractor to directly drive said engine shaft, and steering connections including a rotatable steering post and worm means for transmitting turning movement of said post directly to the yoke of the forward end frame.

11. A tractor including a pair of articulated frames, a drive wheel for each frame, an outrigger frame, a following wheel supported by said outrigger frame, a drive shaft positioned transversely of the tractor, and a prime mover mounted above the point of articulation and serving to drive said shaft.

12. A tractor including a pair of articulated frames, a drive wheel for each frame, a drive shaft positioned transversely of the tractor, operative connections between said shaft and each of said drive wheels, and a prime mover above the point of articulation and serving to drive said drive shaft.

In testimony whereof I affix my signature in presence of two witnesses.

JOHN P. SCHMIT.

Witnesses:
 JOHN L. STEINBERGER,
 RICHARD S. BAKER.